May 8, 1934.     H. O. JOHNSON     1,957,541
IGNITION DEVICE FOR INTERNAL COMBUSTION ENGINES
Filed July 11, 1932
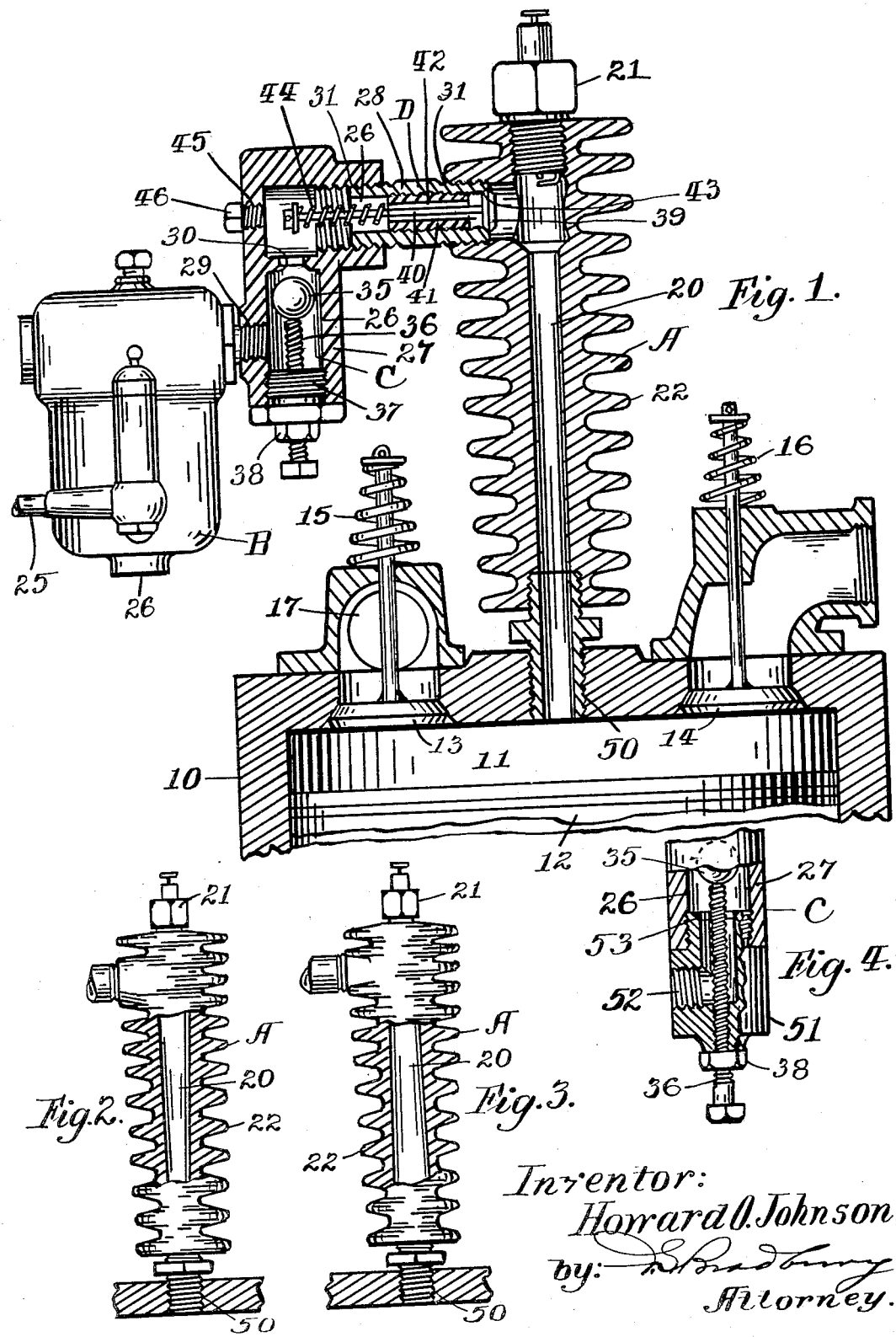
Inventor:
Howard O. Johnson,
by:    *[signature]*
Attorney.

Patented May 8, 1934

1,957,541

UNITED STATES PATENT OFFICE 1,957,541

IGNITION DEVICE FOR INTERNAL COMBUSTION ENGINES

Howard O. Johnson, Whittier, Calif.

Application July 11, 1932, Serial No. 621,894

2 Claims. (Cl. 123—143)

My invention relates to the ignition of low grade fuels, such as comparatively heavy fuel oil, in internal combustion engines, of practically any compression, making it feasible to operate throttle governed and slow speed engines as well as engines of high speed.

The primary object of my invention is the provision of simple and effective means whereby the running of an internal combustion engine of practically any compression may be accomplished with an inexpensive low grade fuel in an efficient manner, thereby minimizing the expense of operating the same without liability of damaging the engine. The invention further provides improved means for most effectively operating internal combustion engines by low grade fuel in which the means for igniting the charge of fuel is regulated and safe guarded to provide an evenly operating igniting flame and thus obtain rapid and even flame propagation in the combustion chamber of the engine. Among further objects is to provide effective means for easily and quickly starting an engine of the class stated when cold or otherwise reluctant to start.

My invention comprises the features of construction and combination of parts hereinafter described and claimed.

In the accompanying drawing forming part of this specification, Figure 1 is a vertical longitudinal sectional view through a fragmentary portion of an internal combustion engine showing my invention applied thereto, portions thereof being shown in side elevation and in vertical longitudinal section; Figs. 2 and 3 are longitudinal vertical sections of alternative constructions of the igniter tube, and Fig. 4 is a longitudinal section of a detail of the igniter tube when constructed for the purpose of applying a priming element for starting purposes.

The internal combustion engine shown is of conventional type and has the usual cylinder 10, combustion chamber 11, piston 12, main inlet valve 13 and exhaust valve 14, said valves being held against their seats by the compression springs 15 and 16 and operated in the usual manner and by the usual means (not shown) but it should be understood that my invention is intended to be applied to any construction of engine and valve mechanism desired within the spirit thereof. The main inlet valve 13 is associated with the usual main fuel inlet passageway 17, which is intended to admit any low grade fuel into the cylinder from a carburetter (not shown) to supply the principal operating medium to the engine.

My improvement provides simple means for positively and effectively igniting the low grade fuel mixture admitted into the combustion chamber and compressed therein by the piston to induce rapid spreading of flame from the point of ignition and comprises the following component parts: Connected with the cylinder by threaded attachment and with the combustion chamber therein in any suitable and convenient position is an igniting tube A for admitting relatively high grade fuel mixture therein above and in contact with the charge of low grade fuel which is admitted into the combustion chamber in the cylinder each intake stroke of the piston, said tube having a bore 20 of comparatively small diameter and having a spark plug 21 of any suitable construction detachably connected therewith and exposed therein in any suitable position either in one end or at any other effective point to ignite the compressed ignition charge of comparatively high grade fuel medium therein. The flame from the compressed ignition charge of high grade fuel propagates and spreads over a large area of and effectively ignites the compressed low grade fuel mixture in the combustion chamber formed by the cylinder and piston. The ignition tube is provided with fins 22 for air cooling and reducing the temperature of the fuel mixture therein below the preignition point. The cooling means may be of any other type than as shown such as by water jacket or otherwise. A carefully measured amount of high grade fuel oil such as gasoline or other volatile liquid or gas and air, supplied by a small carburetter B and supply duct 25 thereto is drawn into the ignition tube A by each suction stroke of the piston through a duct 26 which is controlled by a charge regulating admission valve C and a fuel compression return check valve D. Said duct extends through a suitable admission check valve housing 27 and the compression return check valve coupling 28. The housing 27 is connected with the carburetter B by a threaded connection 29 entering duct 26 below a valve seat 30 and the coupling 28 is attached to said housing and ignition tube A by suitable threaded connections 31.

The regulating valve C, which in the construction shown resembles a ball 35 is sucked up and closes upon the seat 30 against the action of gravity and against the inrush of high grade fuel mixture through the housing from the carburetter into the ignition tube, the length of stroke of the ball, its weight and the passage around the ball being adapted to determine the amount of fuel mixture admitted. The length of stroke and consequent amount of igniting fuel mixture is regulated by the stem 36 which is threaded through the removable guide plug 37. The ball rests freely when in lowermost position upon the upper end of said stem and by turning the stem the length of stroke of the ball is adjusted and the intake of high grade fuel mixture defined. A lock nut 38 holds the stem adjusted. Thus the ball valve 35 unseats itself automatically to freely admit a predetermined amount of high grade fuel mixture upwardly into the ignition tube, during which action the check valve D also opens automatically to admit said charge into the tube. Immediately upon compression of the low grade fuel mixture in the combustion chamber of the engine the check valve 28 closes, causing the charge of high grade fuel mixture to be compressed by and in contact with the low grade fuel mixture.

When fully compressed the high grade fuel mixture is ignited by the spark plug causing a hot flame to spread, propagate and ignite the low grade fuel mixture most effectively.

The check valve D has a valve head 39 and a valve stem 40 slidable freely through a guide 41 which is secured by threading in the wall of duct 26 in the coupling 28. Said guide is passaged longitudinally at 42 in the coupling 28 to freely conduct the high grade fuel mixture through the coupling. Said coupling is countersunk at 43 in its end adjacent to the base of the ignition tube thus forming a seat, upon which the valve head 39 closes. A compression spring 44 held over the valve stem against the guide 41 assists in closing valve D automatically and restrains said valve from opening except during the suction stroke of the piston.

An opening 45 opposite the end of valve stem 40 in the housing 27 allows access to the valve stem for inspection. This opening is closed by a plug 46. Also said opening, when the plug is removed, permits ready attachment of a hand pump (not shown) for priming the ignition tube A with high grade fuel mixture. This is advantageous, particularly when the parts of the device are cold and the ignition of the heavy fuel mixture reluctant.

The shape and size of the bore forming the ignition chamber in the igniting tube A is such that it will not allow the low grade fuel mixture of the main charge to pass back into this chamber to the spark plug during the compression stroke of the piston. Under certain conditions the bore 20 of the tube A may be of uniform diameter as shown in Fig. 1. It may however under other conditions be advantageous to taper the bore in either longitudinal direction as shown in Figs. 2 and 3 to increase or decrease the velocity of compression or propagation of flame upon ignition of the fuel mixture.

The ignition tube A and check valve D may be placed at any convenient angle relative to a vertical or longitudinal engine cylinder and applied to the combustion chamber in the engine at the most advantageous ignition point. The spark plug is also positioned in the ignition tube to ignite the charge of ignition fuel mixture therein most effectively.

The threaded opening 50 is or may be the threaded spark plug opening of an internal combustion engine from which the spark plug has been removed. Thus my improved igniting tube A is applicable to any ordinary internal combustion engine by removing its spark plug, screwing the igniting tube in place thereof and adjusting the spark plug so removed to the igniting tube.

To facilitate starting the engine when cold, the lower end of the housing 27, (see Fig. 4) has a removable passaged end piece 51 threaded thereto and in which is a threaded opening 52 by which the carburetter B may be connected. The upper end of member 51 has a valve seat 53 upon which the valve 35 closes when the screw 36 is turned down. Thus the ball acts as a double valve and in its lowermost position checks the return of a high grade mixture charge into the carburetter when the engine is being primed to start with high grade fuel by the application of an ordinary suction and ignition type of hand pump to the opening 45. The hand pump is used to suck the charge from the carburetter past the check valve and to inject said charge into the igniter. During the injection stroke the return check valve closes upon its seat 53. After priming the pump is removed, the orifice 45 closed, and the valve 35 raised by the screw 36 to function upon valve seat 30.

The charge regulating admission valve C and check valve D may be modified in construction to operate and perform the functions defined within the spirit of my invention. Other modifications of the invention are also contemplated and I desire to have it understood that the construction shown is only illustrative and that the invention can be carried out by other means and applied to uses other than those above set forth within the scope of the following claims.

Having described my invention, what I claim as new and desire to secure by Letters Patent is:

1. In an internal combustion engine, two co-operating elements, one a cylinder and the other a piston, said cylinder and piston forming a combustion chamber and said cylinder having a threaded spark plug opening entering said combustion chamber, an auxiliary ignition tube adapted to be secured in said threaded spark plug opening, a carburetter adapted to produce high grade fuel mixture, means for admitting main charges of low grade fuel into said combustion chamber, a duct connected with the outlet of said carburetter and entering said tube for the admission of high grade fuel mixture received from said carburetter into that portion of said tube remote from said combustion chamber, a check valve in said duct adapted to close when a charge of fuel mixture is compressed in said combustion chamber, a gravity ball check valve in said duct for controlling the admission of predetermined restricted charges of high grade fuel mixture through said duct into said tube, and means for adjusting the range of stroke of said valve to regulate the charge of high grade fuel mixture into said tube.

2. In an internal combustion engine, two co-operating elements, one a cylinder and the other a piston, said cylinder and piston forming a combustion chamber and said cylinder having a threaded spark plug opening, means for admitting main charges of low grade fuel into said combustion chamber, a carburetter adapted to produce high grade fuel mixture, an ignition tube connected with the outlet of said carburetter and having a threaded end adapted to be coupled with said threaded opening, a check valve in said connection closing automatically under the action of compression of fuel mixture in said tube, a gravity valve between the source of high grade fuel and said check valve adapted to close against the action of gravity and define automatically the charge of high grade fuel mixture entering said tube from said carburetter and to drop automatically into valve open position when said check valve closes, means including a threaded stem for regulating the length of stroke of said gravity valve to assist in governing the size of said change and means for igniting the high grade fuel mixture when compressed in said tube by the compression stroke of the piston in said cylinder, whereby the flame from the high grade fuel mixture is spread over the low grade fuel mixture to effectively ignite the low grade fuel mixture in the combustion chamber.

HOWARD O. JOHNSON.